[54] CASCADED DATA MODULATION SYSTEM

[75] Inventors: Charles M. Redman; Ronald W. Moore, both of Las Cruces, N. Mex.

[73] Assignee: The United States of America as represented by the Secretary of the Army, Washington, D.C.

[22] Filed: Oct. 22, 1974

[21] Appl. No.: 516,938

[52] U.S. Cl. ............... 332/7.51; 350/161; 250/199
[51] Int. Cl.$^2$ ...................... H04B 9/10; G02F 1/28
[58] Field of Search ........... 332/7.51; 250/199, 216; 350/161; 73/432 L; 178/6; 343/17.1; 356/5, 28

[56] References Cited
UNITED STATES PATENTS

| | | | |
|---|---|---|---|
| 2,797,619 | 7/1957 | Rosenthal | 350/161 |
| 3,530,298 | 9/1970 | Hubbard et al. | 332/7.51 |
| 3,539,245 | 11/1970 | Brienza | 350/161 |
| 3,624,402 | 11/1971 | Thaler | 250/199 |
| 3,799,652 | 3/1974 | Torguet | 350/161 |

OTHER PUBLICATIONS

Borsuk et al., "Frequency Modulated Laser Communication System", 10/70, pp. 207–209, IEEE Trans. on Sonics & Ultrasonics, Vol. SU-17, No. 4.
Gottlieb, "Opto-Acoustic Signal Processors...", 2/74, pp. 21–27, Optics & Laser Technology.
Lockheed Corp., "A Wideband Laser Communication System," 11/15/71, pp. 1–10.

*Primary Examiner*—Nelson Moskowitz
*Attorney, Agent, or Firm*—Nathan Edelberg; Robert P. Gibson; Saul Elbaum

[57] ABSTRACT

A cascaded data modulation system for the transmission of amplitude and frequency modulation data with a bandwidth up to and greater than 500MHz. The system involves the multiple heterodyning of microwave signals with infrared or optical signals. The data modulation system utilizes the passing of an infrared or optical signal through several successive acousto-optic crystals. Curved and straight prisms are placed alternately between the crystals to guide the infrared or optical signal. The crystals carry acoustic signals which modulate the infrared or optical signal in amplitude and frequency. The output of the crystal system comprises an infrared or optical signal modulated with the desired data, which can be transmitted optically to a transponder, which can in turn convert the last-named infrared or optical signal into a transmitted correspondingly modulated RF signal.

6 Claims, 7 Drawing Figures

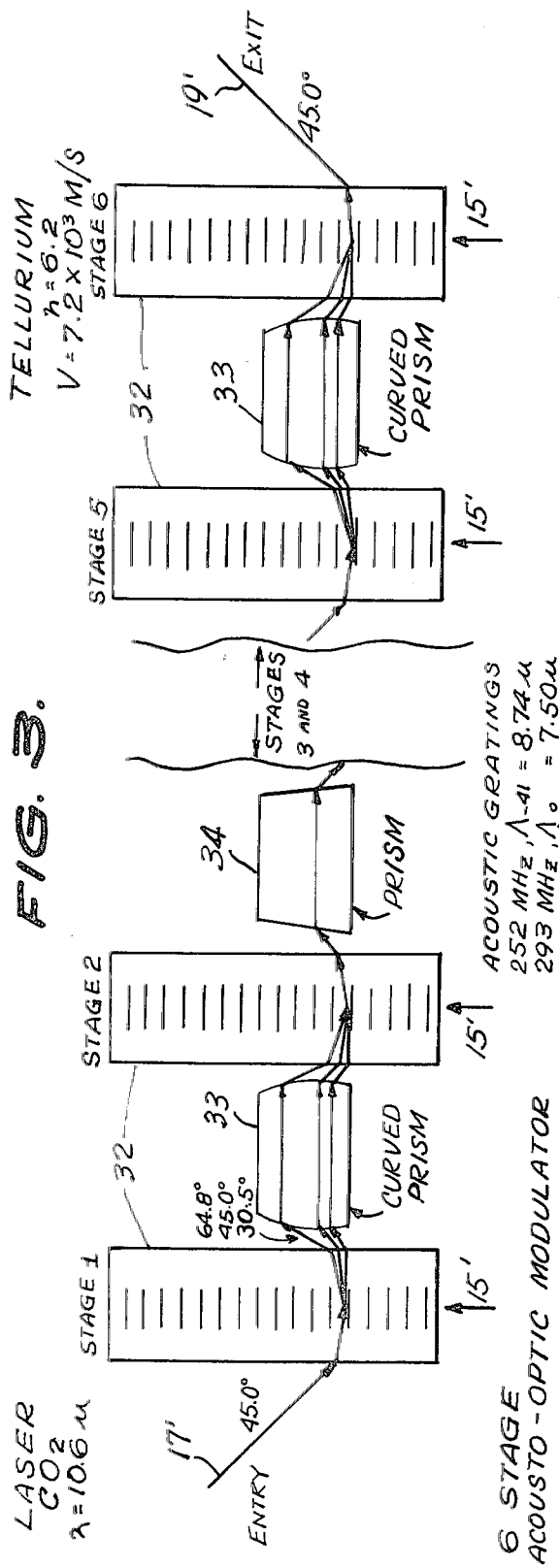
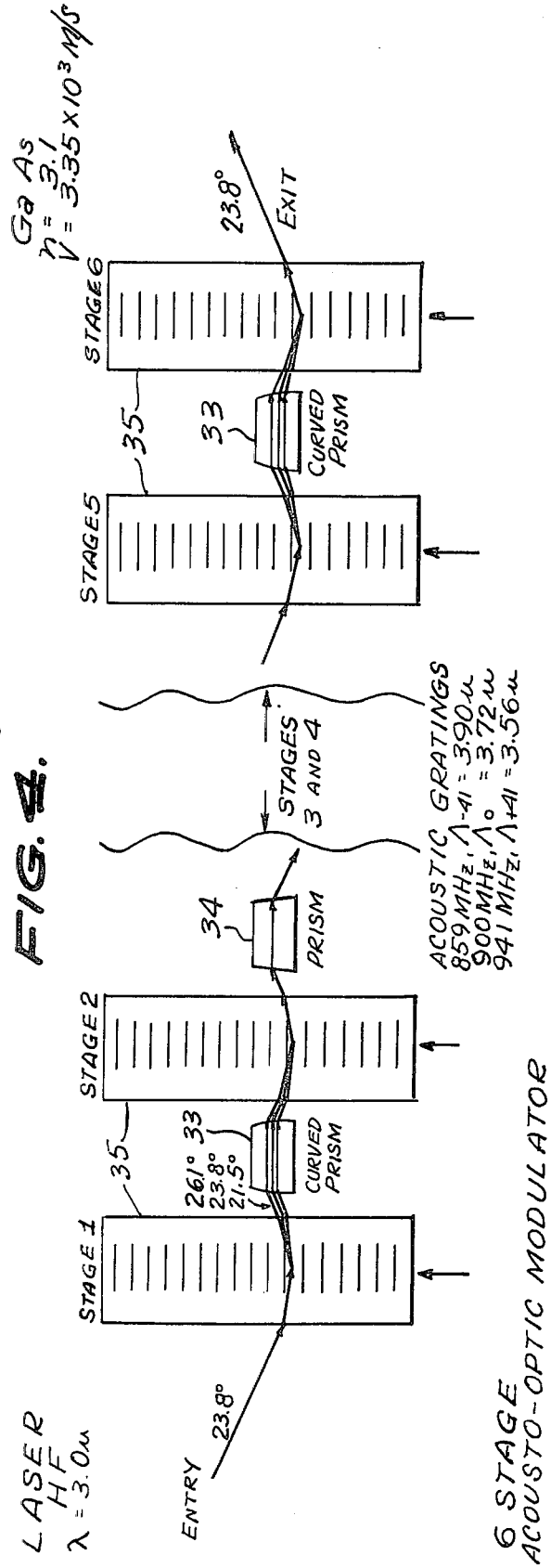

CASCADED DATA MODULATION SYSTEM

RIGHTS OF THE GOVERNMENT

The invention described herein may be manufactured, used, and licensed by or for the United States Government for governmental purposes without the payment to us of any royalty thereon.

BACKGROUND OF THE INVENTION

This invention relates to modulation systems, and more particularly to broadband data modulation systems employing acousto-optical modulation elements.

The broadband data modulation system of the present invention is intended for the transmission of amplitude and frequency modulation (AM and FM) data with a bandwidth up to and greater than 500MHz. This system, as an example, may be employed to relay radar-type data with pulse bandwidths of up to and greater than 30MHz and pulse-to-pulse frequency diversity of up to and greater than 500MHz. The system of the present invention involves the multiple heterodyning of microwave signals with infrared or optical signals, hereinafter referred to as IR signals.

The system of the present invention is further related to the simulation of radar-type signals reflected from aircraft, missiles, chaff, rain, and any other general clutter which may be capable of causing signal reflections. Radar basic frequencies lie normally in a range between 1 and 18GHz, and the system of the present invention contemplates a combination of heterodyne-conversion and frequency division to frequencies and bandwidths which can be processed so as to simulate radar-to-target ranges, target signature, radial doppler, and the effects of space environment on radar signals. The system of the present invention is further intended to be employed under conditions wherein the complexity of the radar transmissions is too great to allow complete reforming of the radar signal based only on radar synchronizing pulses.

SUMMARY AND OBJECTS OF THE INVENTION

Therefore, a main object of the present invention is to provide a novel and improved broadband modulation system for efficiently performing the functions above described.

This object is achieved by passing of an IR signal beam through a plurality of successive acousto-optic crystals upon which are also impressed acoustic signals forming acousto-optic gratings and wherein curved and straight prisms are utilized between the crystals to properly guide the IR signal beam.

Further objects and advantages of the invention will become apparent from the following description and claims, and from the accompanying drawings.

BRIEF DESCRIPTION OF THE DRAWINGS

FIG. 3 is a schematic diagram of a 6-stage acousto-optical modulator according to the present invention which may be employed in a system such as that shown in FIG. 1, this modulator employing Tellurium crystals.

FIG. 4 is a schematic diagram of another 6-stage acousto-optic modulator according to the present invention employing gallium arsenide crystals, wherein a relatively high acoustic frequency is employed as a center driving frequency.

DETAILED DESCRIPTION OF THE INVENTION

In testing and evaluating radar systems, it is necessary to simulate very realistically to the radar the flights of aircraft and missiles that the radar is to sense and keep track of. To realistically simulate aircraft and missile azimuth and elevation angles in space, a very large array of RF transmitters is necessary, to transmit toward the radar the simulations of the aircraft and the missile radar reflections. Communicating these simulations to the large array of RF transmitters is difficult and requires special circuits and subsystems.

Figure 1:
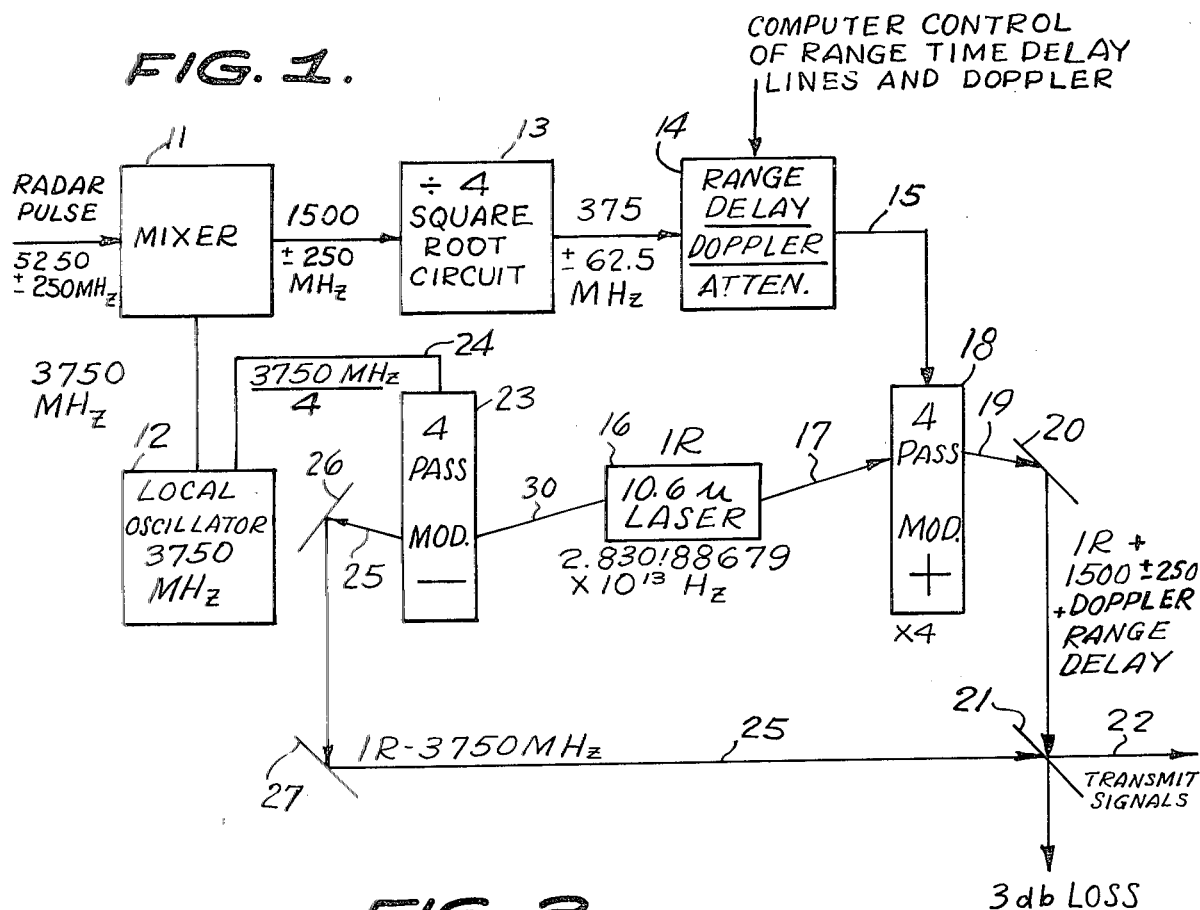
FIG. 1 is a simplified block diagram of a system and circuit for simulating radar data for transmission as IR signals to RF transmitters, said circuit employing broadband modulation devices according to the present invention.

FIG. 1 shows in simplified block form a typical system to process the actual radar transmissions to provide the desired simulation data for transmission to the array of RF transmitters. Radar pulses typically 5250 plus or minus 250MHz are heterodyned in a mixture 11 with the continuous wave 3750MHz output from a local oscillator 12 to derive difference pulses at 1500 plus or minus 250MHz which are divided by a square root circuit 13 and are delivered as 375 plus or minus 62.5MHz pulses to a range-delay, doppler, attenuation processing circuit 14, which is computer-controlled to modify the 375 plus or minus 62.5MHz input pulses to delay them in time according to the desired simulated radar-to-aircraft range, set the signal level to correspond to the desired simulated range and aircraft size, and add a doppler signal input portion to the desired simulated radial velocity on the aircraft. The signals at 15 comprising the modified pulses from the device 14 cover a wide bandwidth and with standard prior techniques it is difficult to satisfactorily transmit the signals to the large array of RF transmitters. There are too many transmitters in the array to allow transmitting the signals by cables. RF carriers are not feasible as the antenna patterns cannot be suitably focused onto the array. It is, therefore, necessary to perform the communication with an IR (or optical) carrier.

Designated at 16 is an optical carrier source, such as $CO_2$ laser, which is one of the best such currently available sources from the standpoints of efficiency, cost, power capacity and quality of continuous wave signals. This laser provides 10.6 micron radiation. Modulation of the 10.6 micron laser radiation with radar signals in the upper microwave frequency and with very broad bandwidth is difficult, and it is necessary to employ acousto-optic modulators for this purpose. Prior art designs of such modulators fail to satisfactorily carry the necessary center frequency or a bandwidth. However, acousto-optic modulators according to the present invention, to be subsequently described herein, provide the desired performance.

In a typical system shown in FIG. 1, IR laser beam 17 is passed through a typical multiple-pass acousto-optic crystal modulator system 18 of the present invention, to which is applied the output pulses 15 from the device 14, thereby modulating the IR beam so that the output laser beam at 19 has the frequency of the IR beam at 17 plus 1500 plus or minus 250MHz plus the doppler-range-delay pulse modifications introduced by device 14. Beam 19 is reflected by a first plane mirror 20 to a semi-transparent inclined mirror 21, from which it is again reflected to form part of an IR transmission beam 22.

Another beam 30 from laser 16 passes through a second multiple-pass acousto-optic crystal modulator 23 constructed in accordance with the present invention, arranged for heterodyne subtraction, to which is applied at 24 a continuous wave reference signal from the local oscillator 12 which has a frequency of one-fourth the 3750MHz fundamental frequency of said oscillator (provided by an internal divider, or the like). The output beam 25 of modulator 23 thus has the frequency of the IR beam at 30 (the same as that at 17) minus 3750MHz. Reference beam 25 is directed by plane mirrors 26 and 27 to pass through semi-transparent mirror 21 and thus combine with beam 19 to form the signal-transmission IR beam 22.

Figure 2:
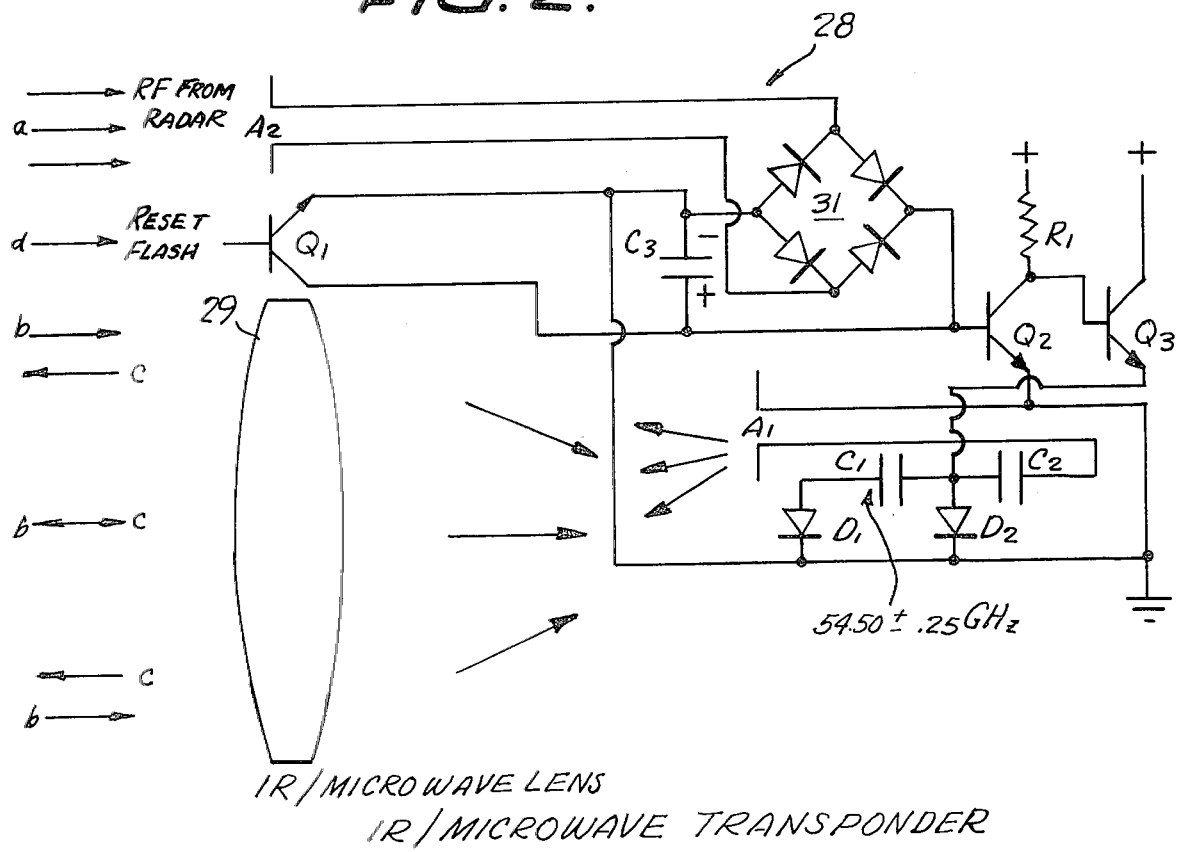
FIG. 2 is a schematic diagram of a system and circuit defining an IR/microwave transponder for receiving the broadband IR signals from the system of FIG. 1 and retransmitting corresponding microwave signals.

Referring to FIG. 2, a typical transponder 28 is disclosed which receives the combined broadband and reference IR signals and retransmits a microwave signal. The transponder 28 may be one of many similar units in a large microwave array used in the testing of complex radars or missile systems. The transponder is intended to provide a microwave output signal simulating the reflection signal obtained from an object located in the radar space field. The parameters of the intended signal are determined by the simulating system comprising device 14 and its computer control.

The basic function of an angle simulating test array, including the many transponders 28, is to receive radar-type signals in the form of frequency and amplitude differentials as between two IR signals (laser beams 19 and 25) and retransmit microwave signals which are identical to or very similar to radar signals as reflected from aircraft, missiles, chaff cloud, ground terrain, and other objects that may be located in the radar space. The two IR beams (forming beam 22) are coaxial and may be pointed at the test array by means of computer-control with galvanometer mirrors. A typical angle simulating test array would cover an angular space with respect to the radar of 120° in azimuth and 90° in elevation and be located on a section of a hemisphere with a radius of about 100 feet, with the radar at the center.

The coaxial IR signal beams carry radar signals which have been processed in a radar target simulator, similar to the system of FIG. 1, where radar-to-target range delay, range attenuation, amplitude type of target signature, radial velocity doppler, and similar information has been added. The galvanometer-directed IR beams in conjunction with the angle simulating test array add angular position and angular target signature to the signals and convert them to the radar frequency.

In the typical transponder 28 of FIG. 2, $a$ designates the RF radiation from the radar, $b$ designates the two incoming coaxial IR signal beams (forming composite beam 22, respectively comprising the IR simulator beam 19 of frequency about 28,300 plus 1.75GHz and the IR reference beam 25 of frequency about 28,300 minus 3.7GHz), $c$ designates the microwave output response transmitted to the radar, of frequency about 5.45 plus or minus 0.25GHz (the heterodyne difference between beams 19 and 25), and $d$ designates a reset flash, presently to be described.

The two coaxial IR signals (forming beam 22) are focused by an IR/microwave lens 29 so as to illuminate the photodiode $D_1$. Diode $D_1$ is normally a PIN type; however, other types of diodes or similar devices may be employed. The function of diode $D_1$ is to heterodyne the two IR signals and develop the corresponding differential microwave signal. In the above typical case, the reference IR signal is 28,300 minus 3.7GHz and the data IR signal is 28,300 plus 1.75 plus or minus 0.25GHz. The difference frequency is therefore 5450 plus or minus GHz. Other IR and microwave frequencies can be utilized, depending upon what microwave frequencies the radar under test utilizes and what IR signal source (laser) and modulator are used.

In the circuit system of FIG. 2, capacitors $C_1$ and $C_2$ isolate diode $D_2$ from diode $D_1$ so that currents can be passed through diode $D_2$ without affecting other elements in the microwave circuits. $D_2$ may also be a PIN diode, and is used to attenuate the microwave signal at said difference frequency proportionally to the current through it. The microwave signal detected in diode $D_1$ and attenuated in diode $D_2$ is furnished through capacitor $C_2$ to antenna $A_1$ and radiated (as microwave output signal $c$) back through the IR/microwave lens 29. Antenna $A_1$ is preferably a broadband spiral antenna to allow using the transponder 28 with a variety of radars. Diode $D_1$ is normally mounted at the center of antenna $A_1$. The lens 29 would not normally be expected to have the same index of refraction for both IR and microwave frequencies. The lens 29 and diode $D_1$ must be mounted so as to focus the IR signal beam to a point on diode $D_1$. The lens 29 and antenna $A_1$ must be so located that the microwave signal is in an essentially flat wave front at the radar antenna approximately 100 feet distance. Fringing of the microwave signal at the edge of the lens may be reduced by the use of an absorber cone around the transponder 28 to absorb the portion of the microwave signal not passing through the center portion of the lens. The lens 29 may be made of inexpensive material such as molded plastic.

There are two control circuits required with a transponder 28 when used as an element of an angle simulation test array as above described: 1) an antenna $A_2$, receiving radiation from the radar (signal $a$), is connected across a bridge rectifier 31 and develops a voltage across a capacitor $C_3$ proportional to the magnitude of the radar signal $a$ striking antenna $A_2$. This signal voltage, buffered through transistors $Q_2$ and $Q_3$, controls the current through diode $D_2$ so as to attenuate the microwave signals detected by diode $D_1$ inversely in proportion to the level of the radar transmission $a$. This control, therefore, senses the magnitude of the radar transmission, memorizes it, and inversely controls the attenuator $D_2$. This causes the angle simulation test array to memorize the radar antenna pattern on a transmission-by-transmission basis. 2) this memory must be erased just prior to each radar transmission, and this is accomplished by a control circuit including a phototransistor $Q_1$ connected across capacitor $C_3$ which receives an optical or IR flash ($d$) just prior to the timing of the radar transmission, causing said phototransistor $Q_1$ to decrease its impedance to a very low value.

Thus, the focused multiple coaxial IR beams $b$ carrying information and data as difference frequency and amplitude are received by the heterodyning diode $D_1$ in a circuit where the differences are detected, amplitude-controlled or attenuated, and retransmitted back through the focusing system.

Acousto-optic modulators must operate close to the relationship of $$\sin \theta = \frac{\lambda}{2\Lambda}$$

$\theta$ is the angle the IR signal enters the transparent material used for the modulator, $\lambda$ is the IR wavelength in air, and $\Lambda$ is the wavelength of the acoustic signal in the crystal. It can be seen that as $\lambda$ becomes shorter, $\Lambda$ can also become shorter, but the shorter wavelength lasers lack the necessary power and are very inefficient. The data modulation devices of the present invention are multiple-pass devices to allow the use of the more efficient long wavelength lasers.

Multiple-pass acousto-optic modulators require RF inputs which have frequencies and amplitudes which are inversely proportional to the number of IR passes through the modulators. A square root circuit such as is shown at 13 in FIG. 1 provides this function.

The system illustrated in FIG. 1 employs 4-pass modulators 18, 23. The modulators presently to be described in detail are multiple-pass modulators operating on the same general principles as the 4-pass modulators 18, 23.

The cascaded data modulation systems of the present invention are multiple-pass modulators which utilize passes of an IR signal through several successive acousto-optic crystals. Curved and straight transparent prisms are placed alternately between the crystals to guide the IR signal.

FIG. 3 shows an example of a 6-stage cascaded data modulation system based on the use of six Tellurium (Te) crystals. The Te crystals shown at 32, carry identical acoustic signals, applied at 15', which modulate the input IR signal (shown at 17') in amplitude and frequency. In this typical example the frequency range of the acoustic signals applied respectively at 15' is 293 ± 41MHz; the IR laser used at 17' is the $CO_2$ laser radiating at a wavelength of 10.6 microns. In the pass through the first Te crystal 32, a portion of the IR signal is deflected upwardly and experiences a gain in frequency precisely equal to the acoustic frequency. The angle of deflection is dependent upon the acoustic wavelength.

The angle of exit from the first crystal 32 is given by the formula $$\sin \theta + \sin \theta' = \frac{\lambda}{\Lambda}$$

$\theta'$ is the desired exit angle, $\theta$ is the entrance angle into the crystal (45.0° in this case), $\lambda$ is the IR wavelength (10.6 microns in this case), and $\Lambda$ is the acoustic wavelength. (All angles are measured with respect to the normal to the Te crystal surface). FIG. 3 illustrates the various exit angles $\theta'$ for the acoustic frequencies of 252MHz, 293MHz, and 334MHz. (The highest frequency causes greatest diffraction.) Other acoustic frequencies lying between the extremes will produce corresponding deflections, according to the above equation. The modulator is designed so that an acoustic wave of the center frequency, namely, 293MHz, causes the IR beam to exit from the crystal at precisely the entrance angle (45.0°). This criterion maximizes the efficiency of the acousto-optic interaction, because 45.0° is the (external) Bragg angle for the acoustic center frequency. The Bragg angle is given by the equation $$\sin \theta = \frac{\lambda}{2\Lambda}.$$

After exiting from the first crystal 32, the IR signal passes through a curved prism 33 which is used to redirect it for the second stage. The curvature of prism 33 is necessary to produce a point-to-point focusing effect. That is, for any acoustic frequency between 252 and 354MHz, the IR beam will intersect the acoustic wave in the second crystal at a common point. The basic symmetry of this arrangement should be noted. For example, the IR beam deflected by a 334MHz acoustic wave in stage 1 exits from the first crystal 32 at an angle of 64.8° the curved prism 33 redirects it so that it enters the second crystal 32 at 64.8°. By the principle of optical reversability, stage 2 is the "reverse" of stage 1. That is, regardless of the acoustic frequency, the IR beam exits from the second Te crystal 32 at the angle at which it entered the first crystal 32 (45.0° in this case). This assumes that the acoustic signals in both crystals are identical at the time the IR signal passes through them. Thus, it may be necessary to allow for adjustment in timing of the acoustic signal through the various crystals.

An ordinary straight transparent prism 34 redirects the IR beam from Stage 2 for entrance into the third Te crystal 32 at 45.0°. No curvature is necessary since all IR signals enter the prism 34 at the same point. A mirror could alternatively be employed for this purpose. Stages 3 and 4 (not shown) are identical to stages 1 and 2, respectively. A curved prism follows stage 3, and a straight-prism follows stage 4. Likewise, stages 5 and 6 are identical to stages 1 and 2, respectively, with a curved prism 33 following stage 5. The IR signal exits at 19' from the sixth and final Te crystal 32, at 45.0°, as shown.

Since the IR signal increases in frequency by an amount in the range 293 ± 41MHz in each stage, after six stages the increase in frequency lies in the range 1758 ± 246MHz. For the particular modulator shown in FIG. 3, this modulation in frequency can be used to produce a radar frequency as follows:

In a system similar to that shown in FIG. 1, another modulator (corresponding to modulator 23 in FIG. 1) is provided with the acoustic waves therein directed in the opposite direction from those in the above-described 6-stage modulation system (employing a constant acoustic driving frequency of 293MHz, so that no curved prisms are necessary). This causes a decrease in IR frequency of 1758 MHz. Thus, when the output of the two 6-stage modulation systems are heterodyned, a difference frequency of 3516 ± 246MHz is obtained. To produce a radar frequency in the 5274 ± 246MHz band, the output of the second modulation system could be sent through a third 6-stage modulator to produce a total IR frequency decrease of 3516MHz.

Heterodyning the outputs of the first and third modulators could then produce a difference frequency of 5274 ± 246MHz.

Figure 5:
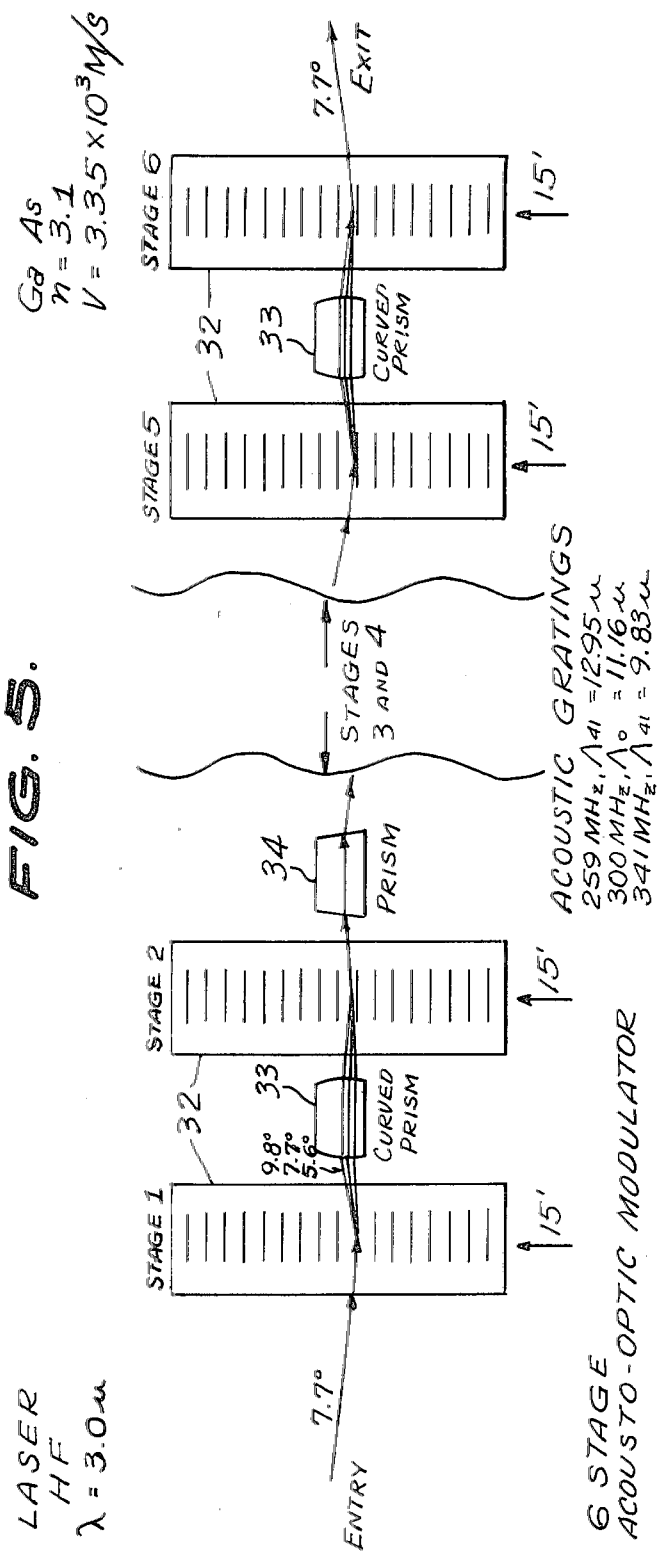
FIG. 5 is a schematic diagram of a 6-stage acousto-optic modulator similar to that of FIG. 4 but employing an acoustic driving frequency approximately the same as in the modulator of FIG. 3.
Figure 6:
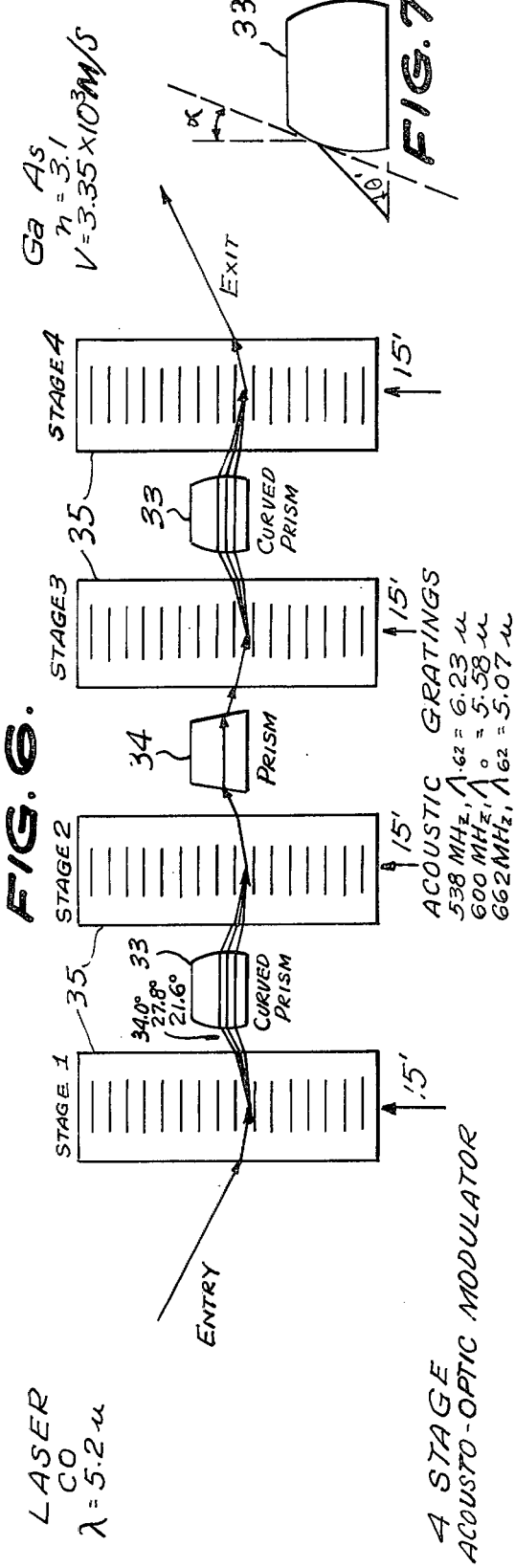
FIG. 6 is a schematic diagram of a 4-stage acousto-optic modulator according to the present invention employing gallium arsenide crystals.

FIGS. 4, 5 and 6 show examples of cascaded data modulation systems employing gallium arsenide (GaAs) crystals 35 instead of Tellurium. Although Tellurium is a much more efficient modulator of IR than GaAs, these modulators have other advantages (and disadvantages). As can be seen by direct comparison of the diagrams, the ± 41MHz acoustic bandwidth causes considerable angular dispersion of the IR beam in the Te modulator. This means that optical alignment of the system is quite critical. The ± 41MHz bandwidth in FIGS. 4 and 5 causes only very slight angular dispersion, and even the ± 62MHz bandwidth in FIG. 6 does not cause too much dispersion.

The basic operation of the systems of FIGS. 4 and 6 is the same as that for the Te modulator and will not be described in detail. However, some comments concerning the specific IR wavelengths and acoustic frequency bands are appropriate for the sake of comparison.

FIG. 4 shows an example of a cascaded data modulation system centered at an acoustic frequency of 900MHz. A high frequency laser radiating at 3.0 microns is used. After 6-stages through the cascaded data modulation system the IR frequency is increased by an amount in the range 5400 ± 246MHz. Thus, by heterodyning the output of the modulator of FIG. 4 with a reference IR beam there is directly produced a radar frequency of 5400 ± 246MHz. Thus, only one modulator instead of two or three is necessary in order to produce the radar frequency. The high acoustic frequency range, however, requires a larger amount of acoustic power, since transducer losses are greater at high frequencies.

FIG. 5 shows a cascaded data modulation system very similar to that of FIG. 4. The high frequency laser with $\lambda$ = 3.0 microns is also used here. However, an acoustic band of 300 ± 41MHz (very nearly the same as in FIG. 3) is used. While this modulator has the advantage of operating at lower acoustic frequencies, three modulators of this type would be necessary to produce a radar frequency; the same scheme as described above in connection with the Tellurium modulator of FIG. 3 could be used to produce a radar frequency of 5400 ± 246MHz.

FIG. 6 illustrates a cascaded data modulation system with only four stages instead of six. This particular system used a CO laser radiating at a wavelength of 5.2 microns, and an acoustic frequency band of 600 ± 62MHz. Since 4 stages are used, the modulation in IR frequency is 2400 ± 248MHz. By heterodyning the modulator output with a reference IR beam, a radar frequency in this band is obtained. A second 4-stage modulator could be driven in reverse acoustically to provide a reference IR at 3050MHz. Heterodyning 3050MHz and 2400 248MHz would give 5450 ± 248MHz. the major limitation of this system lies in the use of the CO laser, which is not nearly as efficient as the powerful $CO_2$ laser and which requires a sophisticated cooling system. The system of FIG. 6, however, has the important advantage of requiring only four crystals 35 instead of six.

The examples shown in FIGS. 3 to 6 indicate that there is a wide variety in choice of acousto-optic crystals, IR wavelength, acoustic frequency band, and number of stages to be used, in a cascaded data modulation system in accordance with the present invention.

In the positive-driven arrangement, each stage of the modulator system adds the acoustic signal in frequency to the IR frequency. The system also multiplies the waveforms of the IR input and the acoustic signals. Prior signal conditioning must take this into consideration.

Figure 7:
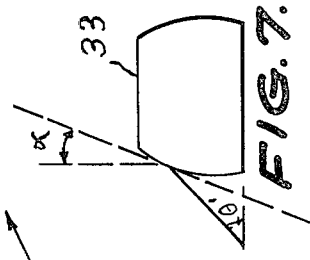
FIG. 7 is a diagram illustrating the manner in which the curvature of the curved prisms of the modulators is determined.

Referring to FIG. 7, the curvature of the curved prisms 33 can be determined as follows: let n be the index of refraction of the prism material. Suppose an IR beam exists from the first crystal 32, for example, at an angle $\theta'$. This beam must strike the prism 33 in such a way that the tangent to the prism at the point of contact is tilted at an angle $\alpha$ with the vertical, where $\alpha$ is given by $$\tan \alpha = \frac{\sin \theta'}{n - \cos \theta'}$$

This produces the necessary point-to-point focusing effect.

We wish it to be understood that we do not desire to be limited to the exact details of construction shown and described, for obvious modifications can be made by a person skilled in the art.

What is claimed is:

1. A system for transmitting data over a wide bandwidth comprising an array of a plurality of successive acousto-optic transparent crystals, a high frequency signal source with side bands adapted to contain such data, means to apply the output of said signal source to said crystals in a manner to form acoustic gratings in the crystals, a source of optical radiation providing a coherent optical beam, means to direct said optical beam successively through said array of crystals in a manner to traverse said acoustic gratings, whereby the beam emerges from said array modulated with a bandwidth in accordance with the number of passes of the beam through the acoustic gratings, and means to demodulate the emerging modulated optical beam, wherein said directing means includes a transparent prism in the path of said optical beam, wherein said transparent prism is located between two adjacent crystals of said array in the path of the optical beam, and wherein said prism has at least one curved surface arranged to provide a focusing action on said optical beam.

2. A system for transmitting data over a wide bandwidth comprising an array of a plurality of successive acousto-optic transparent crystals, a high frequency signal source with side bands adapted to contain such data, means to apply the output of said signal source to said crystals in a manner to form acoustic gratings in the crystals, a source of optical radiation providing a coherent optical beam, means to direct said optical beam successively through said array in a manner to traverse said acoustic gratings, whereby the beam emerges from said array modulated with a bandwidth in accordance with the number of passes of the beam through the acoustic gratings, and means to modulate the emerging modulated optical beam, and wherein said directing means includes transparent prisms between the successive crystals in the path of said optical beam, at least one of said prisms having curved surface means arranged to provide a focusing action on said optical beam.

3. The system of claim 2, and wherein said crystals are arranged in successive pairs and wherein said directing means comprises curved-sided transparent prisms between the two crystals of each pair and straight-sided transparent prisms between the respective pairs of crystals, the curved-sided prisms being arranged to provide sustantially angular symmetry of the entry and exit optical modulation beam elements passing therethrough.

4. A modulation system comprising an array of a plurality of successive acousto-optic transparent crystals arranged to define an optical path and being adapted for form acoustic gratings therein responsive to the application thereto of a high frequency electrical signal, means to apply a common high frequency electrical signal to the crystals, and means to guide an optical beam through the successive crystals, whereby to modulate the optical beam with data from said electrical signal with a bandwidth in accordance with the number of passes of the optical beam through the acoustic gratings of the crystals, and wherein said guide means includes optical focusing lens means in the optical path between the crystals.

5. A modulator comprising an array of a plurality of successive acousto-optic transparent crystals arranged to define an optical path and being adapted to form acoustic gratings therein responsive to the application thereto of a high frequency electrical signal, and means to guide an optical beam through the successive crystals, whereby to modulate the optical beam through the acoustic gratings of the crystals, and wherein said guide means includes transparent prisms between the successive crystals in the optical path, at least one of the prisms having a curved surface intersecting said optical path and arranged to provide a focusing action on an optical beam traveling along said path.

6. A modulator comprising an array of a plurality of successive acousto-optic transparent crystals arranged to define an optical path and being adapted to form acoustic gratings therein responsive to the application thereto of a high frequency electrical signal, and means to guide an optical beam through the successive crystals, whereby to modulate the optical beam with data from said electrical signal with a bandwidth in accordance with the number of passes of the optical beam through the acoustic gratings of the crystal, and wherein said crystals are arranged in successive pairs and wherein said guide means comprises a curved-sided transparent prism between the two crystals of each pair and straight-sided transport prisms between the respective pairs of crystals, the curved-sided prisms being arranged to provide substantially angular symmetry of the entry and exit optical modulation beam elements passing therethrough.

* * * * *